United States Patent [19]
D'Anna et al.

[11] 3,927,310
[45] Dec. 16, 1975

[54] DIGITAL TEST APPARATUS

[75] Inventors: Ronald F. D'Anna, Baltimore; Richard E. Llewellyn, Laurel, both of Md.

[73] Assignee: The United States of America as represented by the Secretary of the Air Force, Washington, D.C.

[22] Filed: Jan. 25, 1974

[21] Appl. No.: 436,562

[52] U.S. Cl............................ 235/153 AC; 324/73 R
[51] Int. Cl.².................... G06F 11/00; G01R 15/00
[58] Field of Search ............ 235/153 AC; 324/73 R; 340/172.5

[56] References Cited
UNITED STATES PATENTS

| 3,673,397 | 6/1972 | Schaefer | 235/153 AC |
| 3,740,646 | 6/1973 | McMahon, Jr. | 324/73 R |
| 3,764,995 | 10/1973 | Helf, Jr. et al. | 340/172.5 |
| 3,777,129 | 12/1973 | Mehia | 235/153 AC |
| 3,790,885 | 2/1974 | James | 324/73 R |

Primary Examiner—Charles E. Atkinson
Attorney, Agent, or Firm—Joseph E. Rusz; William Stepanishen

[57] ABSTRACT

A digital test apparatus utilizing digital data selection, acquisition and display for testing and fault isolation in digital equipment having multiplexed data ports.

7 Claims, 1 Drawing Figure

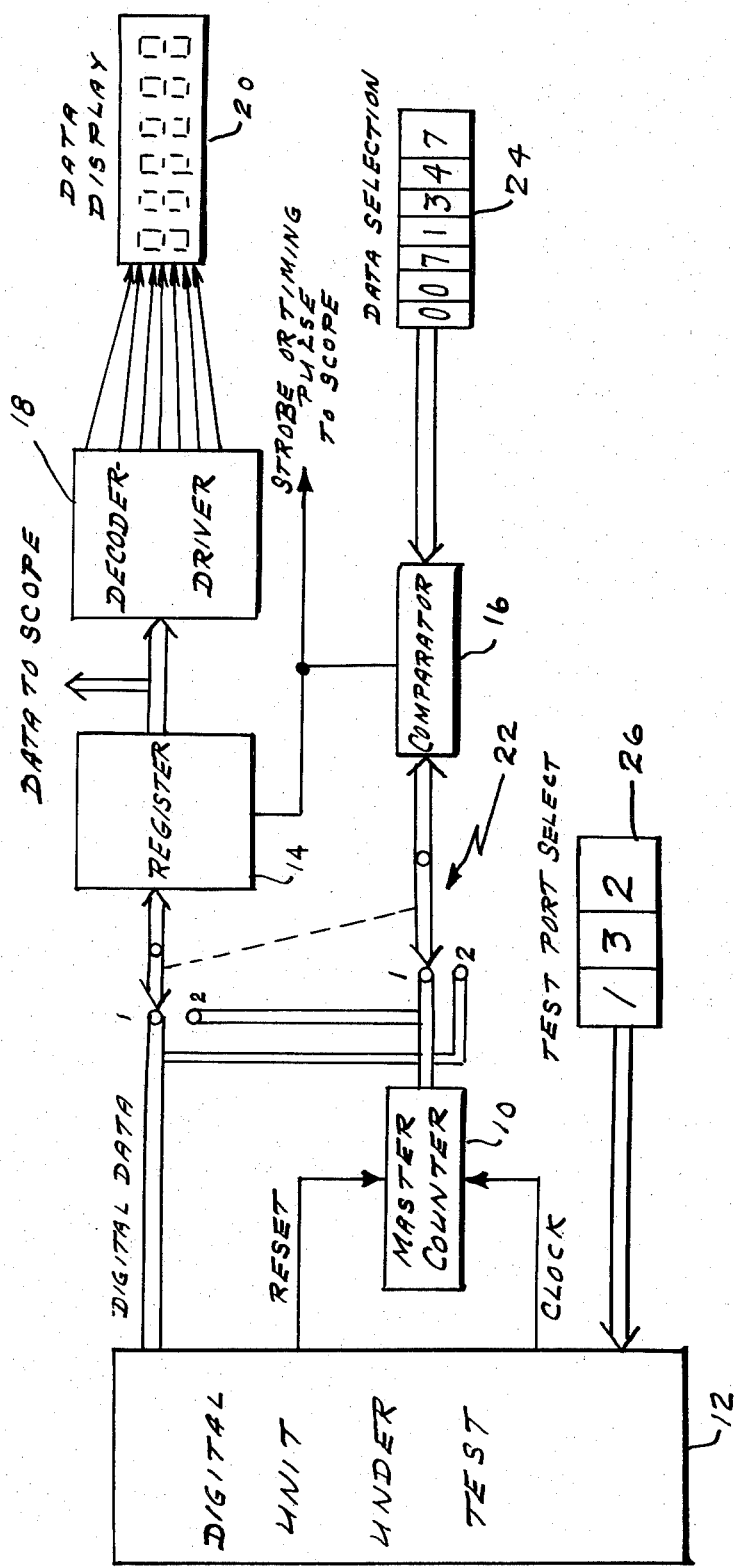

DIGITAL TEST APPARATUS

BACKGROUND OF THE INVENTION

The present invention relates broadly to a digital test apparatus and in particular to a data selection acquisition and display apparatus for testing multiplexed data port digital equipment.

In the prior art, troubleshooting and fault isolation in digital equipment often required laborious manual probing of test ports to select, acquire and display test data. In order to speed up troubleshooting in digital signal processors, digital words are sometimes observed by means of a high speed digital to analogue converter, where access to a multi-pin test connector is available. At best, the maximum resolution of 5 to 6 bits can be achieved with a digital to analog converter which is monitored with an oscilloscope. This resolution represents a small fraction of the word lengths which may be 20 bits or higher, that may be found in signal processors. The alternative has been to individually probe each bit of the word and to record the results. However, this time consuming technique doesn't always work when there is a long time delay between a reference pulse and the word to be measured. With long delays, it becomes impossible to determine where the word to be examined really is in time. Even if the correct time is found, it may be impossible to measure the bit values at that time due to the jitter in the time delay base in the oscilloscope.

SUMMARY

The present invention utilizes a digital data selection, acquisition and display technique for use in testing and fault isolating digital equipment which is designed with multiplexed data ports. The digital test apparatus provides an economic means to rapidly and accurately acquire and display a digital data word that occurs at a selected test port and clock time, or to acquire and display the clock time at which a selected data word of a selected port occurs. These data are displayed on numeric readout devices and may also be observed in real time on an oscilloscope.

It is one object of the invention, therefore, to provide an improved digital test apparatus having the capability of selecting, acquiring and displaying all the bits of a digital word, simultaneously for any selected time within the time cycle of the unit under test.

It is another object of the invention to provide an improved digital test apparatus capable of testing digital equipment having variable clock rates.

It is yet another object of the invention to provide an improved digital test apparatus having the capability of counting clock pulses rather than measuring time.

It is still another object of the invention to provide an improved digital test apparatus providing fast, accurate and economic fault isolation of digital equipment utilizing multiplexed data ports.

These and other advantages, object and features of the invention will become more apparent from the following description taken in connection with the illustrative embodiment in the accompanying drawing, wherein the FIGURE is a block diagram of the digital test apparatus for testing digital equipment having multiplexed data ports.

DESCRIPTION OF THE PREFERRED EMBODIMENT

Referring now to the FIGURE, there is shown a master clock 10 connected to the digital unit under test 12. The digital unit under test 12 supplies reset and clock pulses to the master clock 10, as well as digital data to either the register 14 or the comparator 16. The testing and troubleshooting of present day complex digital units is made easier when the multiplexed data ports of the digital unit itself is utilized. These digital units contain many internal test ports which are multiplexed and wired to a test connector. The test of this type of digital unit is therefore considerably less complex when compared to conventional digital machines since the means is now provided for access to internal test ports via external control.

The present invention is a digital test set capable of rapid and accurate selection, acquisition and display of digital test data from digital machines designed with multiplexed data ports. The digital test set operates in one of two modes. In the first mode, it will display the numerical value of the digital data at a selectable time and a selected port. The present invention can select any data port within the digital equipment under test and display the data at any selected clock time.

The operation of the digital test set apparatus is as follows. When the mode switch 22 is in position 1, the display data mode, a master counter 10 is reset at the beginning of the cycle time of the equipment under test 12. The test port select numeral is applied by numerical test port selection switch 26 to the digital unit under test 12. The number which is dialed into the numerical test port selection switch 26 selects the proper test port that is to be tested within the digital test unit 12. The test port select switch 26 is a conventional device which is commercially available under part number 28010–03 from Digitran Company, 855 South Arroyo Parkway, Pasadena, Calif. The data selection switch 24 is a numerical data switch for the selection of a predetermined time in mode 1, the display data mode or a preselected data word in mode 2, the display time mode. The numeral in the data selection switch 24 is applied to comparator 16. The data selection switch 24 is a conventional device which is commercially available under the part number 28107–05 from Digitran Company, Pasadena, Calif. The data display unit 20 is a seven segment numerical readout which displays data when mode 1, the display data mode is selected and displays time when mode 2, the time mode is selected. The data display unit 20 is commercially available under part No. MAN1 from Montsano Company, Electronics Special Products, 10131 Bubb Road, Cupertino, Calif.

The counter 10 advances for each data clock from the unit under test 12. When the master counter's count reaches the same value as the selected time value, which is applied to comparator 16 by numerical data switch 24, the comparator 16 strobes the register 14 on the data line. The data value at the selected time is decoded in decoder-driver unit 18 and applied to data display unit 20 to be displayed in the 7 segment numerical readout. This strobe or timing pulse from the comparator 16 is also used as a synch pulse for an oscilloscope for real time data display.

When the mode switch 22 is moved to the other mode, position 2, the display will readout the time that a selected data word occurs. The only thing that is different, is that the role of the master counter 10 and the input are interchanged. Now the comparator 16 checks the input data against the selected input. Upon detecting an equality the comparator 16 strobes the current value of the master counter 10 into the register 14 for display on the numerical readout 20. During either mode of operation the second numerical switch 26 is used to select the test port being displayed.

The components which are utilized for the master counter 10, the register 14, the comparator 16 and the decoder driver 18 are conventional devices that are commercially available. The master counter 10 may be obtained under part number AM93164A from Advanced Micro Devices, 901 Thompson Place, Sunnyvale, Calif. The register 14 and the comparator 16 are also available from Advanced Micro Devices under the parts numbers AM9300 and AM9324 respectively. The decoder driver 18 is commercially available under the part number SN7447 from Texas Instruments, P.O. Box 5012, Dallas, Tex.

The digital data selection, acquisition and display test equipment disclosed herein allows fast, accurate and economic fault isolation of digital machines designed with multiplexed data ports. This has previously been orders of magnitude more difficult with conventional test equipment designed to test and fault isolate digital machines which do not have multiplexed data ports. The present test apparatus can select, acquire and display all the bits of a digital word simultaneously for any selected time within the cycle time of the machine under test. In other words with the digital test set and a machine designed with multiplexed data ports, it is possible to select and display data at any test port for any time within the machine cycle time. Therefore, data can be rapidly examined throughout the digital machine under test. By this means, the fault at a particular time and port may be found down to the board level. Even further fault isolation to the bad component on the failed board may be achieved. This is accomplished by manual probing of the board and the use of the strobe (timing pulse) obtained from the disclosed test set to sync a scope. The strobe corresponds to the time at which the failure occurs at the selected test port, and is therefore a most convenient reference in time for looking for the failure.

Although the invention has been described with reference to a particular embodiment, it will be understood to those skilled in the art that the invention is capable of a variety of alternative embodiments within the spirit and scope of the appended claims.

What is claimed is:

1. A digital test apparatus for the test of digital equipment utilizing multiplexed data ports comprising in combination:

test port selecting means connected to the unit under test for selecting the test port to be tested, data selecting means connected to said unit under test for selecting preselected data within said unit under test, said preselected data having a predetermined time within the time cycle of the unit under test, means for synchronizing the timing of said test apparatus with said unit under test connected to said test apparatus and said unit under test, said synchronizing means receiving clock and reset signals from said unit under test, said synchronizing means providing timing signals to said test apparatus, means for acquiring said preselected data from said unit under test, said acquiring means acquiring said preselected data when said synchronizing means' timing coincides with preselected time, and means for displaying said preselected data from said acquiring means.

2. A digital test apparatus as described in claim 1 wherein said acquiring means comprises in combination:

a register connected to said unit under test to receive digital data a comparator connected to said synchronizing means to receive timing pulses, said comparator connected to said data selecting means to receive said preselected time, said comparator providing a strobe signal to said register when said timing pulses coincide with said preselected time, said strobe signal triggering said register to output said digital data, and a decoder driver unit connected to said register to receive said digital data, said decoder driver unit decoding said digital data and providing a drive signal corresponding to said digital data to said display means.

3. A digital test apparatus as described in claim 1 wherein said synchronizing means comprises a master clock unit connected to said unit under test to receive reset and clock pulses therefrom, said master clock unit providing timing pulses to said comparator.

4. A digital test apparatus as described in claim 1 wherein said display means comprises a seven segment numerical readout connected to said decoder driver unit to receive said drive signal, said seven segment numerical readout providing a numerical display of said digital data in response to said drive signal.

5. A digital test apparatus as described in claim 1 wherein said data selecting means comprises a numerical data switch for selecting the preselected time of said preselected data.

6. A digital test apparatus as described in claim 1 wherein said test part selecting means comprises a numerical data switch for selecting the test port of said unit under test to be tested.

7. A digital test apparatus as described in claim 1 further including a mode switch connected between said synchronizing means and said acquiring means, said mode switch having a first and second switch position, said first switch position being the display data mode, said second switch position being the display time mode, said first and second switch position being alternative.

* * * * *